(12) United States Patent
Kim et al.

(10) Patent No.: US 7,376,338 B2
(45) Date of Patent: May 20, 2008

(54) INFORMATION STORAGE MEDIUM CONTAINING MULTI-LANGUAGE MARKUP DOCUMENT INFORMATION, APPARATUS FOR AND METHOD OF REPRODUCING THE SAME

(75) Inventors: Byung-jun Kim, Gyeonggi-do (KR); Jung-wan Ko, Gyeonggi-do (KR); Hyun-kwon Chung, Gyeonggi-do (KR); Bong-gil Bak, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1077 days.

(21) Appl. No.: 10/165,427

(22) Filed: Jun. 10, 2002

(65) Prior Publication Data

US 2003/0012558 A1    Jan. 16, 2003

(30) Foreign Application Priority Data

Jun. 11, 2001   (KR) ............................... 2001-32493
Oct. 20, 2001   (KR) ............................... 2001-64943

(51) Int. Cl.
*H04N 7/00*   (2006.01)
*H04N 5/445*  (2006.01)
*G06F 9/44*   (2006.01)

(52) U.S. Cl. ..................... 386/95; 348/468; 348/564; 717/114; 717/115

(58) Field of Classification Search ............ 386/4, 386/39, 40, 45, 46, 52, 55, 95, 102, 105, 386/106, 107, 117–126; 707/500.1, 501.1, 707/4, 102; 348/468, 563, 564, 589; 704/1; 717/114, 115

See application file for complete search history.

(56) References Cited

U.S. PATENT DOCUMENTS

| 4,899,292 | A |   | 2/1990 | Montagna et al. |
| 5,442,782 | A | * | 8/1995 | Malatesta et al. ............... 707/4 |
| 5,548,509 | A |   | 8/1996 | Takagi |

(Continued)

FOREIGN PATENT DOCUMENTS

EP   0 762 422   12/1997

(Continued)

OTHER PUBLICATIONS

Office Action issued in Japanese Patent Application No. 2002-168903 on Aug. 30, 2005.

(Continued)

*Primary Examiner*—Thai Q. Tran
*Assistant Examiner*—Mishawn Dunn
(74) *Attorney, Agent, or Firm*—Stein, McEwen & Bui, LLP (57) ABSTRACT

An information storage medium containing multi-language markup document information, and an apparatus for and a method of reproducing the information storage medium which includes audio/video (AV) data, multiple markup documents which contain text information to be displayed in a selected language with a video picture decoded and reproduced from the AV data, and multi-language markup document information for designating one of the multiple markup documents as a markup document in the selected language. Accordingly, the information storage medium allows the reproducing apparatus to display the text information included in the markup document in the interactive mode in respective multiple languages.

30 Claims, 7 Drawing Sheets

U.S. PATENT DOCUMENTS

| | | | |
|---|---|---|---|
| 5,995,159 A * | 11/1999 | Bae et al. .................... | 348/563 |
| 6,018,742 A * | 1/2000 | Herbert, III ................. | 707/102 |
| 6,047,292 A | 4/2000 | Kelly et al. | |
| 6,259,858 B1 | 7/2001 | Ando et al. | |
| 6,345,147 B1 * | 2/2002 | Mimura et al. ............... | 386/97 |
| 6,434,326 B1 | 8/2002 | Kondo et al. | |
| 6,473,778 B1 * | 10/2002 | Gibbon ................... | 715/501.1 |
| 6,603,837 B1 * | 8/2003 | Kesanupalli et al. ..... | 379/88.17 |
| 7,219,338 B2 * | 5/2007 | Venter ....................... | 717/140 |
| 2002/0067433 A1 * | 6/2002 | Yui et al. .................... | 348/588 |
| 2002/0159756 A1 * | 10/2002 | Lee ............................ | 386/95 |
| 2004/0034521 A1 * | 2/2004 | Kawakura et al. ............ | 704/1 |

FOREIGN PATENT DOCUMENTS

| | | |
|---|---|---|
| EP | 0 863 509 | 9/1998 |
| EP | 0 886 276 | 12/1998 |
| JP | 11-18048 | 1/1999 |
| JP | 11-098467 | 4/1999 |
| JP | 11-161663 | 6/1999 |
| JP | 2000-182359 | 6/2000 |
| WO | 00/63915 | 10/2000 |
| WO | 02/05104 | 1/2002 |

OTHER PUBLICATIONS

Chinese Patent Office Search Report dated Jan. 21, 2004.
EP 866276A2.
Search Report issued in the European Patent Application No. 02254067.8 on Mar. 13, 2007.
Office Action issued in Taiwanese Patent Application No. 91112504 on Jun. 21, 2007.

* cited by examiner

MULTI-LANGUAGE MARKUP
DOCUMENT INFORMATION

- DISPLAYABLE LANGUAGE INFORMATION

| INFORMATION | VALUE |
|---|---|
| NUMBER OF DISPLAYABLE LANGUAGES | 3 |
| CODE OF DISPLAYABLE LANGUAGES | 0x0412, 0x0411, 0x0409 |
| CHANGEABILITY OF LANGUAGE CONVERSION DURING REPRODUCTION | 1 OR 0 |

- LANGUAGE MAPPING TABLE

| DVD-VIDEO LANGUAGE CODE | HTML DOCUMENT LANGUAGE CODE |
|---|---|
| KR(0x0412) | KR(0x0412) |
| JP(0x0411) | JP(0x0411) |
| EN-US(0x0409) | EN-US(0x0409) |
| ZH(0x0004) | EN-US(0x0409) |

- LANGUAGE-DIRECTORY INFORMATION

| CHARACTER CODE (ISO-639) | PATH NAME OF LANGUAGE DIRECTORY AND START HTML DOCUMENT |
|---|---|
| KR(0x0412) | \DVD_ENAV\KOR\A.HTM |
| JP(0x0411) | \DVD_ENAV\JPN\A.HTM |
| EN-US(0x0409) | \DVD_ENAV\ENG\A.HTM |

(A) KOREAN

\DVD_ENAV\KOR\A.HTM OUTPUT

FIG. 6A

(B) JAPANESE

\DVD_ENAV\JPN\A.HTM OUTPUT

FIG. 6B (C) ENGLISH

\DVD_ENAV\ENG\A.HTM OUTPUT

INFORMATION STORAGE MEDIUM CONTAINING MULTI-LANGUAGE MARKUP DOCUMENT INFORMATION, APPARATUS FOR AND METHOD OF REPRODUCING THE SAME

CROSS-REFERENCE TO RELATED APPLICATIONS

This application claims the benefit of Korean Patent Application Nos. 2001-32493 and 2001-64943, filed Jun. 11, 2001 and Oct. 20, 2001, respectively, in the Korean Industrial Property Office, the disclosures of which are incorporated herein by reference.

BACKGROUND OF THE INVENTION

1. Field of the Invention

The present invention relates to an interactive information storage medium and a reproducing apparatus for and a reproducing method of reproducing the same, and more particularly, to an interactive information storage medium containing multi-language markup document support information which is provided together with a reproduced data stream displayed in a display window defined by a markup document, and an apparatus for and a method of reproducing the information storage medium.

2. Description of the Related Art

A proposed interactive digital versatile disc (DVD) medium (e.g., a PC Friendly DVD disc) in a current market can be reproduced in an interactive mode by a PC(Personal Computer). The interactive DVD medium contains markup language documents and audio/video (AV) data. The AV data recorded on the interactive DVD medium is reproduced as an AV data stream and displayed in a video mode or the interactive mode. In the video mode, the AV data is displayed in the same way as it is displayed on a regular DVD player while in the interactive mode, the AV data is displayed together with an HTML document in a display window defined by the HTML document. If the interactive mode is selected by a user, a web browser installed in the PC displays the HTML document recorded on the interactive DVD medium. The AV data related to the HTML document is reproduced and displayed in the display window defined by the HTML document.

For example, in a case of a movie whose content is the AV data, a video picture corresponding to a title of the AV data is displayed in a portion of the display window defined by the HTML document, and in the remaining portion of the display window, a variety of supplementary information including scripts, stories, and photos of actors and actresses can be displayed. The supplementary information may be displayed in synchronization with the title of the AV data. For example, when an actor or an actress is displayed in a moving picture section of the display window, the HTML document containing a brief biography is invoked and displayed together with the video picture.

An existing DVD-video standard defines sub-picture data that provides one of multi-language captions together with the reproduced title. Therefore, the user can enjoy the captions of the AV data in a desired language when watching the video picture.

However, the proposed interactive DVD is disadvantageous in that it allows text-based supplementary information to be displayed in only one language together with the AV data in the interactive mode. That is, the proposed interactive DVD does not have any capability to present the supplementary information displayed through the HTML document in multiple languages. Therefore, the user cannot understand text-based information displayed through the HTML document in a foreign language which the user cannot understand. As a result, the interactive mode provided by the interactive DVD is not attractive to the user.

SUMMARY OF THE INVENTION

To solve the above and other problems, it is an object of the present invention to provide an information storage medium providing text information displayed through a markup document in an interactive mode in multiple languages, and an apparatus for and a method of reproducing the information storage medium.

Additional objects and advantageous of the invention will be set forth in part in the description which follows and, in part, will be obvious from the description, or may be learned by practice of the invention.

To achieve the above and other objects, there is provided an information storage medium containing audio/video (AV) data, multiple markup documents which contain text information on respective multiple languages to be displayed in a selected language and define a display window to display a video picture corresponding to an AV data stream decoded and reproduced from the AV data, and multi-language markup document information selecting a markup document to be displayed in the selected language from the multiple markup documents.

It is possible that the medium includes reproducing control information on the AV data, wherein the AV data is decoded and reproduced as the AV data stream with reference to the reproducing control information.

It is possible that the AV data and the reproducing control information are recorded on a video directory while the markup documents and the multi-language markup document information are recorded on an interactive directory.

To achieve an aspect of the present invention, an information storage medium includes audio/video (AV) data, sub-picture data for providing a multi-language caption together with the reproduced AV data, multiple markup documents which contain text information on respective multiple languages to be displayed in a selected language with regard to the AV data or the sub-picture data and defines a display window to display the video picture of the AV data stream decoded from the AV data, and multi-language markup document information selecting a markup document in the selected language from the multiple markup documents.

It is possible that the medium may include reproducing control information on the AV data and the sub-picture data, wherein the AV data and the sub-picture data are decoded and reproduced as the AV data stream and the caption with reference to the reproducing control information.

It is possible that the AV data, the sub-picture data, and the reproducing control information are recorded on a video directory while the markup documents and the multi-language markup document information are recorded on an interactive directory.

It is possible that the markup documents are recorded in multi-language markup document directories which are named by respective languages and sub-directories of the interactive directory, and the markup documents containing the same meaning of text information even though displayed in respective multiple languages have the same file name when recorded on the medium.

It is possible that the multi-language markup document information includes displayable language information that indicates the kind of the displayable languages recorded on medium, and respective language directory information for indicating a path name corresponding to the markup documents. It is also possible that language mapping information for mapping a markup document to the selected language is recorded on the medium.

To achieve another aspect of the present invention, a reproducing method includes reproducing the AV data recorded on the information storage medium and displaying the AV data in a display window defined by a markup document. The reproducing method also includes reading a markup document designed to be displayed in a selected language for caption out of multiple markup documents that have text information to be displayed in respective multiple languages, reading and decoding the AV data, and displaying the video picture of the AV data stream of the AV data through the read markup document.

To achieve another aspect of the present invention, a reproducing method includes reproducing the AV data and multi-language captioning sub-picture data, which are recorded on the information storage medium, and displaying the video picture of the AV data and the caption of the sub-picture data in the display window defined by the markup document. The reproducing method also includes receiving language information on a selected language in order to present the caption, identifying the selected language corresponding to the received language information, and retrieving the markup document in the directory corresponding to the identified language.

It is possible that the receiving of the language information includes identifying a markup document language code corresponding to the selected language for the caption display by using language mapping information, and invoking the markup document in a directory where the identified markup document language code is stored.

It is possible that the invoking of the markup document includes storing the markup document in the directory that has a directory name corresponding to the identified language code.

To achieve another aspect of the present invention, a reproducing method includes reproducing the AV data recorded on an information storage medium and displaying the video picture of the AV data stream in the display window defined by the markup document. The reproducing method also includes reading the markup document designed to be displayed in the selected language by user preference out of the markup documents that have text information to be displayed in respective multiple languages, reading and decoding the AV data, and displaying the AV data as the AV data stream in the display window.

To achieve another aspect of the present invention, a reproducing method includes reproducing the AV data recorded on the information storage medium and displaying the video picture of the AV data in the display window defined by the markup document. The reproducing method also includes receiving information on a selected language in order to display the markup document corresponding to the selected language, identifying the selected language corresponding to the received language information, and retrieving the markup document in a directory corresponding to the identified language.

It is possible that the identifying of the language includes retrieving the markup document language code corresponding to the selected language by using language mapping information, and retrieving and invoking the markup document in the directory corresponding to the retrieved language code.

To achieve yet another aspect of the present invention, a reproducing apparatus reproduces the AV data recorded on the information storage medium and displays the video picture of the AV data in the display window defined by the markup document. The reproducing apparatus includes a reader reading necessary data from the information storage medium, an AV decoder decoding the AV data read by the reader, and an AV blender displaying both the markup document decoded by a presentation engine and the video picture corresponding to the AV data stream decoded from the AV data by the AV decoder in the display window defined by the markup document, and the presentation engine interpreting the markup document that has the text information to be displayed in the selected language out of multiple markup documents that have text information to be displayed in respective multiple languages.

To achieve yet another aspect of the present invention, the reproducing apparatus reproduces the AV data and the multi-language captioning sub-picture data, which are recorded on the information storage medium, and displays both the video picture of the AV data and the captions in the display window defined by the markup document. The reproducing apparatus includes the reader reading necessary data from the information storage medium, the AV decoder decoding the AV data read by the reader, and the AV blender displaying the markup document decoded by the presentation engine, AV data and the sub-picture data for a caption display. The presentation engine interprets the markup document recorded in the directory indicated by the received language information to be stored in the information to display multi-language markup documents, and displays the video picture of the AV data stream in the display window defined by the markup document.

It is possible that when the markup document is displayed in connection with the captions, the presentation engine refers to the multi-language markup document information, retrieves the markup document language code corresponding to the language code selected for the caption display, and retrieves and invokes the markup document recorded in the directory which the retrieved language code indicates. If only the markup document is displayed, the presentation engine refers to the multi-language markup document information and retrieves and invokes the markup document stored in the directory corresponding to the selected language by a user preference.

According to still another aspect of the present invention, it is possible that the information storage medium includes video data having first captions and interactive data having second captions. It is also possible that the information storage medium includes the AV data representing the video picture and the sub-picture data representing the first captions to be displayed in respective multiple languages with the video picture in a video picture section of the display window defined by the markup document. The information storage medium also includes multi-language markup document information containing the text information representing second captions to be displayed in respective multiple languages in a text section of the markup document.

According to yet another aspect of the present invention, the reproducing apparatus and the reproducing method reproduce the information storage medium to display the first captions corresponding to the video picture of the AV data in the display window and the second captions corresponding to the markup document in the text section of the markup document.

BRIEF DESCRIPTION OF THE DRAWINGS

These and other objects and advantageous of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

A markup document means not only a markup document itself but also a web resource that includes files inserted into or linked with the markup document. A hypertext markup language (HTML) document means a document which is prepared in a mark-up language such as multiple markup language (XML) or standard generalized markup language (SGML) and can be interpreted and displayed by a web browser.

Figure 1:
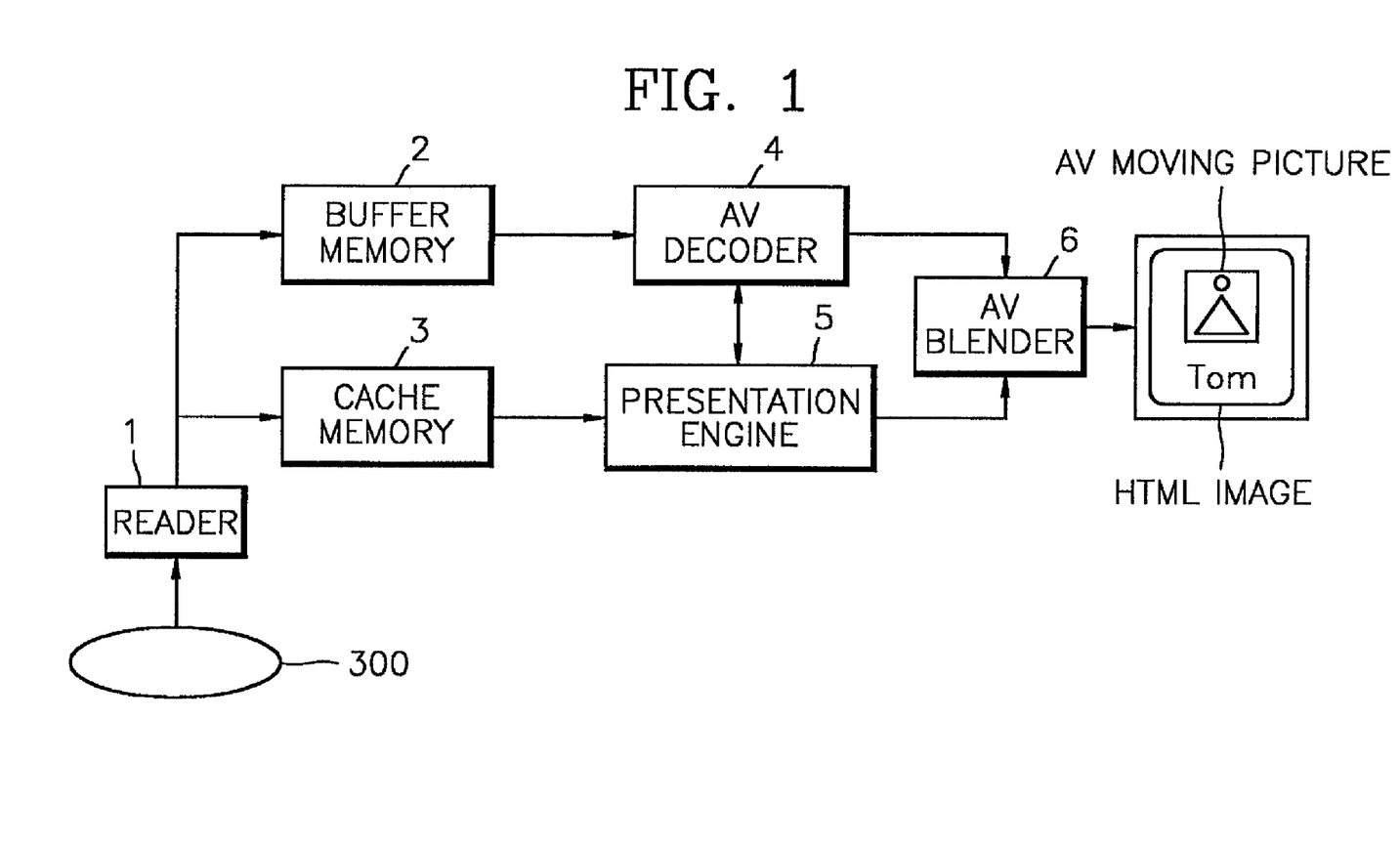
FIG. 1 is a block diagram of a reproducing apparatus according to an embodiment of the present invention.

FIG. 1 is a block diagram of a reproducing apparatus according to an embodiment of the present invention. With reference to FIG. 1, the reproducing apparatus decodes audio/video (AV) data recorded on a DVD 300 and reproduces the AV data as an AV data stream. Then, the reproducing apparatus displays a video picture corresponding to the reproduced AV data in a display window defined by the markup document in an interactive mode and includes a reader 1, a buffer memory 2, a cache memory 3, an AV decoder 4, a presentation engine 5, and an AV blender 6.

The presentation engine 5 supports the interactive mode. In terms of software, the presentation engine 5 includes application programs such as a markup document viewer (for example, the web browser), a program interpretation engine, and a plug-in that interfaces through an Application Program Interface (API) with an operating system (OS) of the reproducing apparatus. With the API, which performs a special pre-defined method, the presentation engine 5 can send a request to the OS and other application programs. The program interpretation engine includes the JavaScript or a Java interpretation engine. The plugin enables various markup documents to be displayed.

In terms of hardware, the presentation engine 5 is set to have a first default value of markup document language information of the reproducing apparatus, that is, the information about a language of the markup document that is displayed when the interactive mode is selected. For example, the reproducing apparatus to be sold in English-speaking nations has the markup document language information that commands a selection of the markup document having text information in English. It is possible that the markup document language information varies depending on where the reproducing device is marketed or which languages are dominant. If a user changes the first default value of the markup document language information to a user value, the markup document is displayed in a new selected language or relevant language in accordance with the user value.

The reader 1 reads the HTML document (markup document) or the AV data from the DVD 300. The DVD 300 contains a data packet where sub-picture data and AV data are multiplexed and packaged. Therefore, the reading of the AV data means reading the sub-picture together with the AV data. However, if the user does not select a caption display function, the sub-picture data is discarded without being reproduced. The buffer memory 2 buffers the AV data read by the reader 1. The cache memory 3 caches the markup document read by the reader 1. The AV decoder 4 decodes the AV data buffered in the buffer memory 2 and outputs the AV data stream. The presentation engine 5 interprets the read markup document and identifies a location of the display window. Then, the AV blender 6 displays the markup document outputted by the presentation engine 5 and the AV data stream outputted by the AV decoder 4 in the display window.

Figure 2:
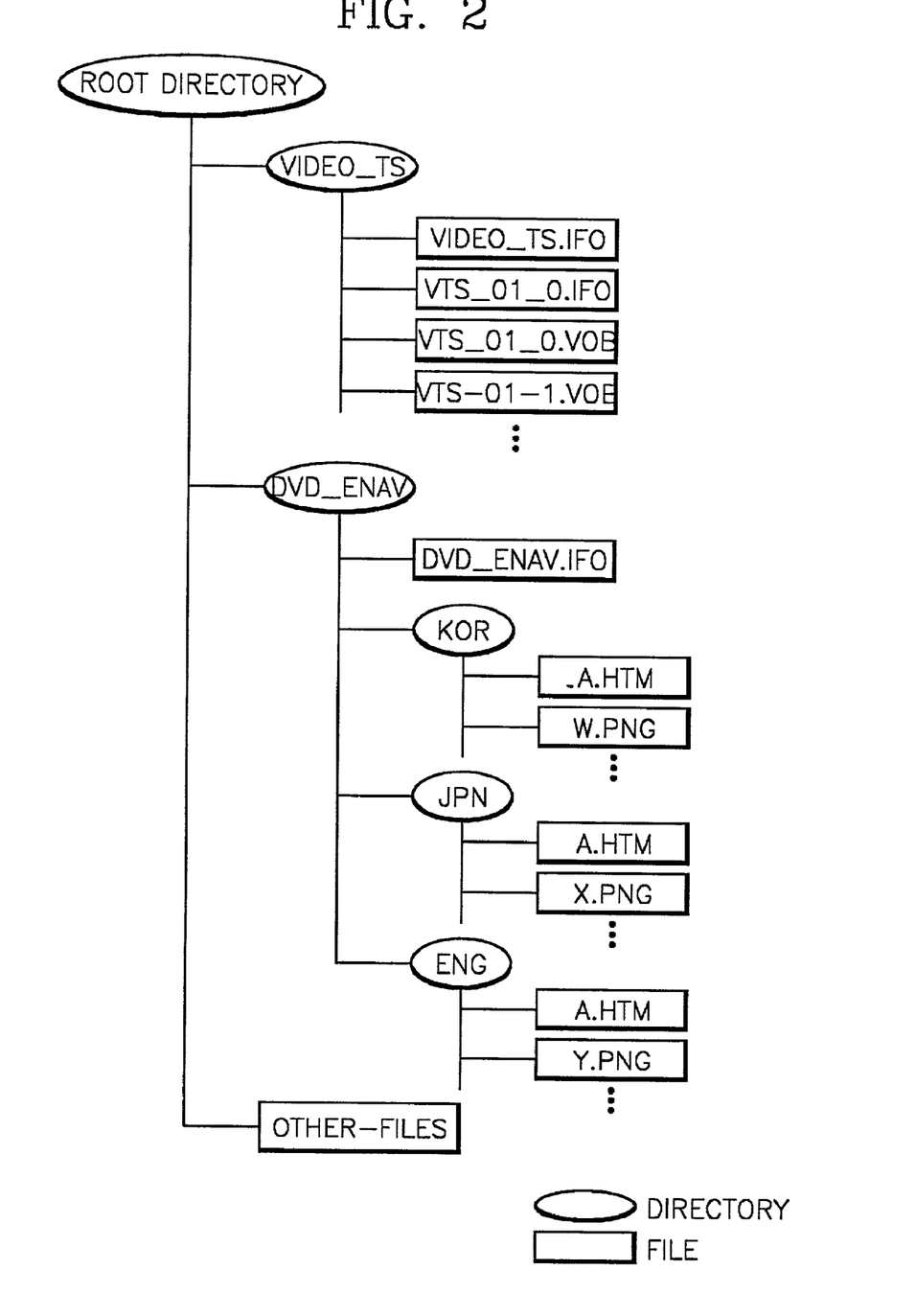
FIG. 2 shows a structure of files stored in a DVD of FIG. 1.

FIG. 2 shows a structure of files stored in the DVD 300 of FIG. 1.

The DVD 300 contains multiple markup documents having the same meaning of the content in different languages so that the text information included in the markup documents can be displayed in multiple languages. That is, the DVD 300 includes the multiple markup documents which contain exactly the same meaning text information in respective multiple languages.

With reference to FIG. 2, a root directory includes directories VIDEO_TS and DVD_ENAV. The directory VIDEO_TS is a DVD video directory containing the AV data, and the directory DVD_ENAV is a DVD interactive directory containing data including the markup document that supports the interactive mode.

The DVD video directory VIDEO_TS includes files VIDEO_TS.IFO, VTS_01_0.IFO, VTS_01_0.VOB, and VTS_01_1.VOB. The file VIDEO_TS.IFO contains reproducing control information on the entire video titles and language information designated as a second default value of the video title. In the file VTS_01_0.IFO, the reproducing control information on each video title set is recorded. The files VTS_01_0.VOB and VTS_01_1.VOB are a Video Object Set (VOS) that makes up the video title set. Each VOB includes video data, audio data, and sub-picture data. The sub-picture data is designed to display the captions of the movie. More detailed configuration information is included in the DVD-Video Standard DVD-Video for Read Only Memory Disc 1.0.

The DVD interactive directory DVD_ENAV includes a file DVD_ENAV.IFO which contains the reproducing control information on the entire title information in the interactive mode. To be more specific, the file DVD_ENAV.IFO includes a definition and configuration of each relevant directory, the number of titles included, basic information, the language used for the title, information on captions and fonts, markup document display information such as resolution and color, and copyright information. The file DVD_ENAV.IFO further includes multi-language markup document information . The multi-language markup document information will be described in detail later. In addition, multi-language markup document directories including KOR, JPN, and ENG, are prepared to support languages of the markup document. KOR, JPN, and ENG indicate a Korean Language directory, a Japanese Language directory, and an English Language directory, respectively. Each multi-language markup document directory includes an image file A.HTM which has the same meaning of the text information in an associated language, and PNG files W.PNG, X.PNG, and Y.PNG which are displayed together with A.HTM. Because W.PNG, X.PNG, and Y.PNG are the same image in different languages, they may have the same file name. A Portable Network Graphics (PNG) file is a compressed graphic image file. Here, it is possible that an audio file, such as an AU file, or an AIFF file can be attached to the image file instead of the PNG file in another language.

Thus, the DVD 300 includes the video data having first captions and interactive data having second captions. The information storage medium includes the AV data representing the video picture and the sub-picture data representing the first captions to be displayed in respective multiple languages with the video picture in a video picture section of the display window defined by the markup document. The information storage medium also includes in the interactive data multi-language markup document information containing the text information representing second captions to be displayed in respective multiple languages in a text section of the markup document.

Figure 3:
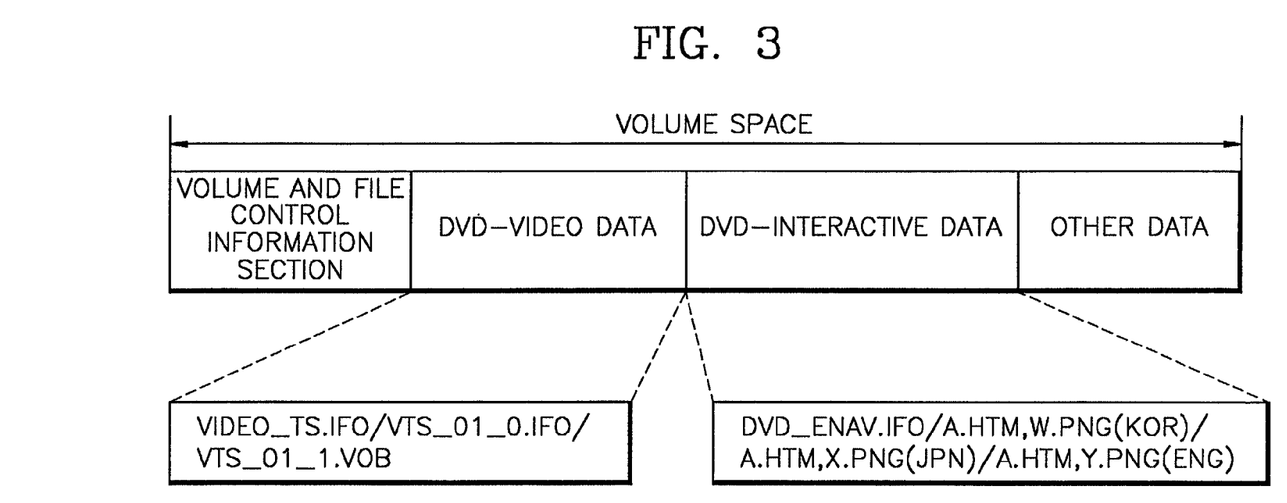
FIG. 3 is a diagram of a volume space of the DVD of FIG. 2.

FIG. 3 is an outline diagram of a volume space of the DVD 300 of FIG. 2. With reference to FIG. 3, the volume space of the DVD 300 includes a control information section that includes volume and file control information, a DVD-video data section that includes relevant video title data, and a DVD-interactive data section that contains data to support the interactive mode.

The DVD-video data section contains the files VIDEO_TS.IFO, VTS_01_0.IFO, VTS_01_0.VOB, and VTS_01_1.VOB that are recorded in the DVD video directory DVD_TS of FIG. 2. The DVD-interactive data section contains the files DVD_ENAV.IFO, A.HTM (KOR), A.HTM (JPN), A.HTM (ENG), W.PNG, X.PNG, and Y.PNG, which are recorded in the DVD interactive directory DVD_ENAV of FIG. 2.

Figure 4:
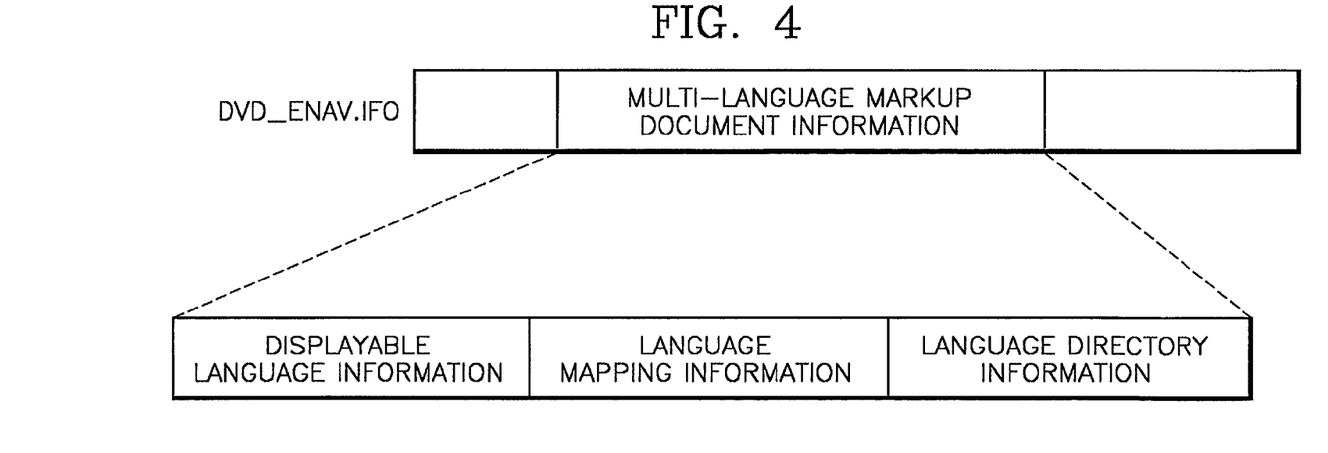
FIG. 4 is a diagram showing a structure of a multi-language markup document information file explained in FIGS. 2 and 3.

FIG. 4 shows the structure of the file DVD_ENAV.IFO explained in FIGS. 2 and 3. With reference to FIG. 4, the file DVD_ENAV.IFO includes the multi-language markup document information . The multi-language markup document information contains displayable language information on the kind of languages provided in the DVD 300 for the interactive mode, language mapping information, and language directory information corresponding to respective language.

Figure 5:
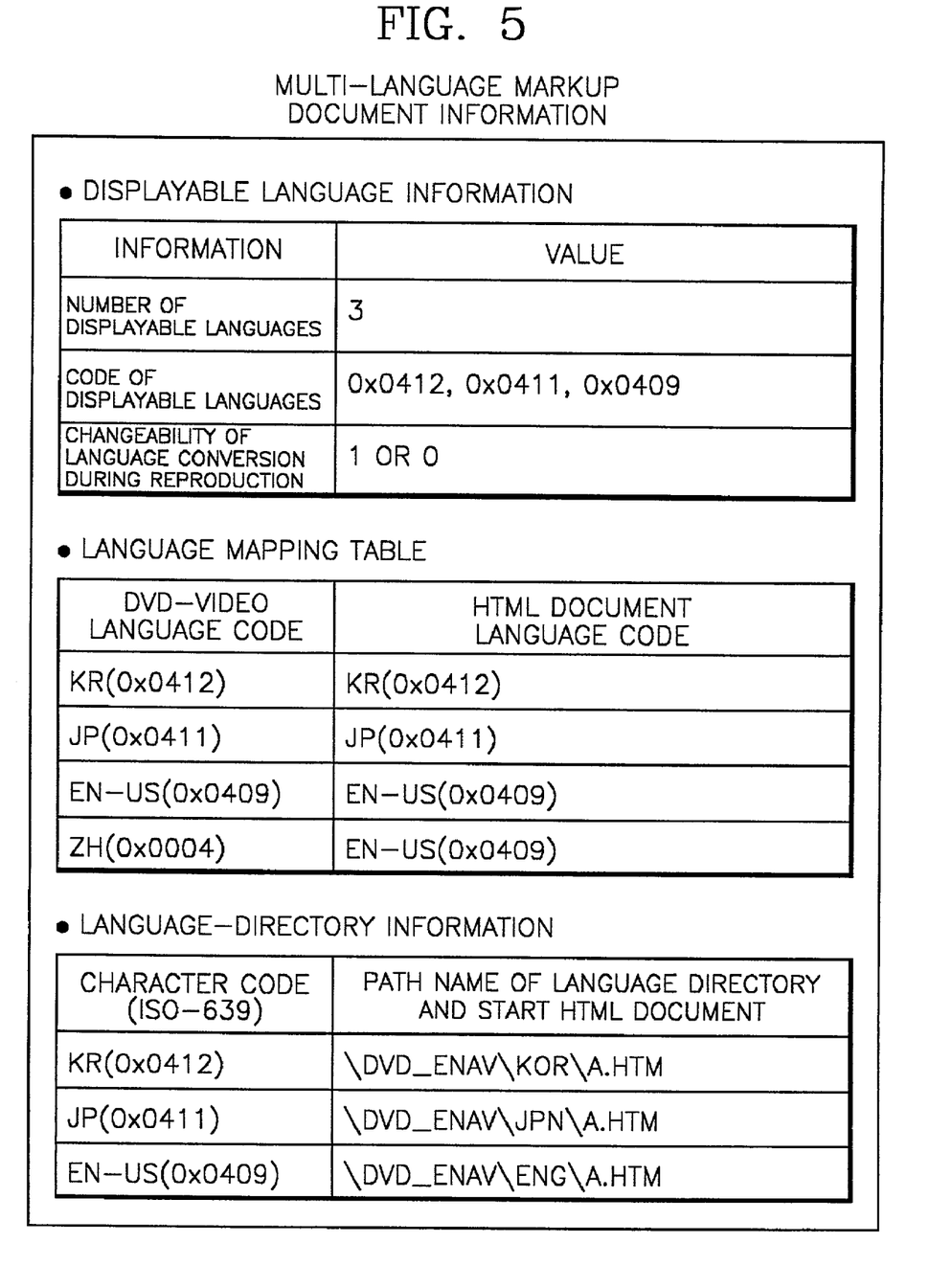
FIG. 5 is a detailed diagram of the multi-language markup document information of FIG. 4.

FIG. 5 is a detailed structural diagram of the multi-language markup document information of FIG. 4. With reference to FIG. 5, the displayable language information included in the multi-language markup document information includes information on the number of displayable languages, codes of the displayable languages, and a changeability of a language conversion of whether the languages can be changed (converted) during reproduction of the DVD 300.

The codes of the displayable languages can be indicated using the ISO-639 language codes. 0×0412, 0×0411 and 0×0409 are hexadecimal values and indicate Korean, Japanese, and English, respectively.

In a language mapping table containing the language mapping information, caption language codes are mapped to HTML document language codes relating to the HTML documents which are referred to for extracting the markup documents that contain the text information to be displayed in a language corresponding to one of the caption language codes. To be more specific, the caption is displayed in Korean, Japanese, English, or Chinese. The markup document displayed with the caption is displayed in Korean, Japanese, or English. Therefore, if the user selects Korean, Japanese, or English for the caption, the markup document is displayed in the corresponding language, Korean, Japanese, or English. However, if the user selects Chinese for a caption display, the markup document is displayed in English when the caption language codes do not include Chinese. The number of the displayable languages can vary. Even when the markup document is displayed without the caption, the language mapping table can be referred to for extracting the markup document. For example, if the language of the reproducing apparatus is set as Chinese (ZH), the presentation engine 5 displays the markup document prepared in English (EN-US) by referring to the language mapping table. The information on the changeability of the language of the markup document indicates whether the user can change the language during reproduction of the AV data. "0" indicates that the language cannot be changed while "1" indicates that the language can be changed.

The language directory information includes path names of the multi-language markup document directories containing markup documents corresponding to respective ones of the displayable language codes and a file name of the HTML document designated as a start document file.

Figure 6A:
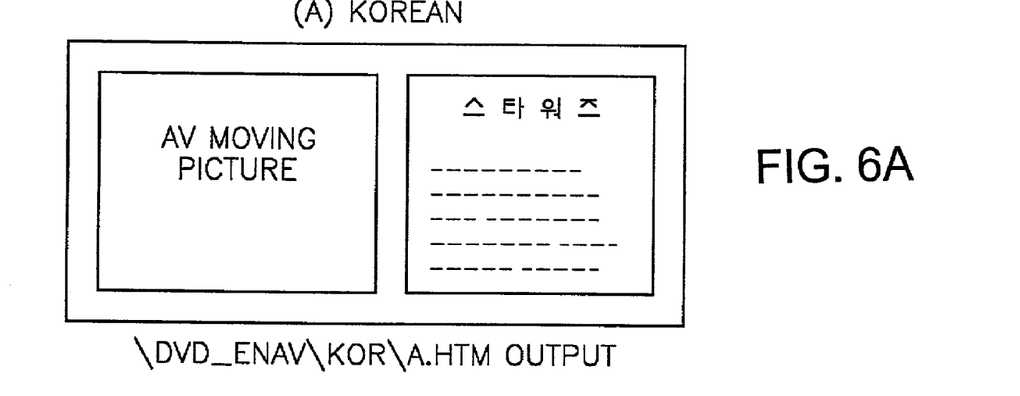
FIGS. 6A, 6B, and 6C show examples of markup documents retrieved and displayed with reference to the multi-language markup document information of FIG. 5.
Figure 6B:
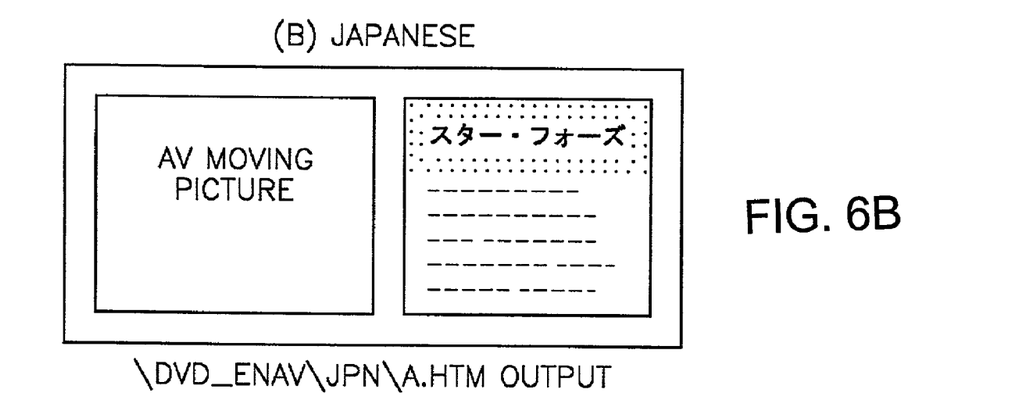
Figure 6C:
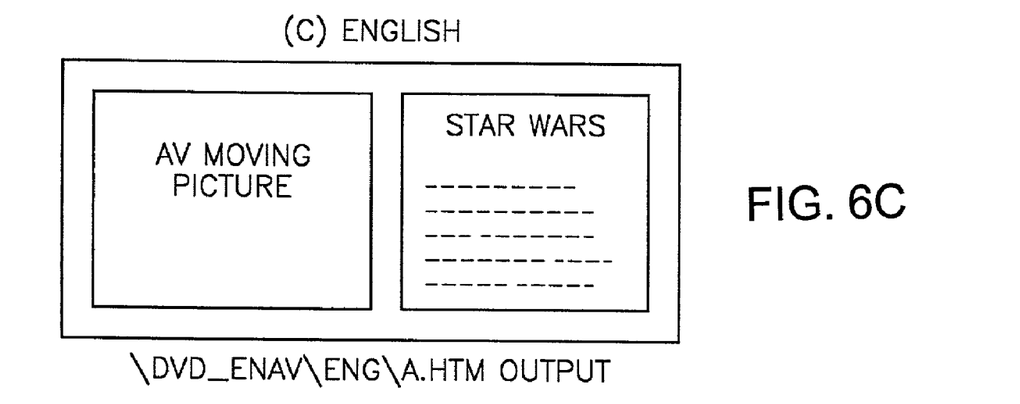

FIG. 6A through 6C shows examples of the markup documents retrieved and displayed with reference to the multi-language markup document information of FIG. 5. FIGS. 6A through 6C show markup documents displayed in a text section of the markup document when one of a Korean caption, Japanese caption, and English or Chinese caption is selected . In a case of the Chinese caption, the caption language is different from the text information is displayed in the markup document. That is, since the multi-language markup document is supported in the interactive mode, the markup document containing the text information prepared in the language mapped to the caption selected by the user or the language selected by the user is displayed. If the user changes the Korean caption into the Japanese caption while a video title is reproduced in the interactive mode, the markup document displayed together with the video title is changed from FIG. 6A to FIG. 6B. That is, the A.HTM is read to display the markup document stored in the multi-language markup document directory JPN by referring to the language mapping table and the language directory information shown in FIG. 5.

If the markup document is displayed without the caption, the markup document containing the text information prepared in the language selected by the user is displayed even though the caption is not displayed.

A reproducing method according to another embodiment of the present invention is described as follows.

Figure 7:
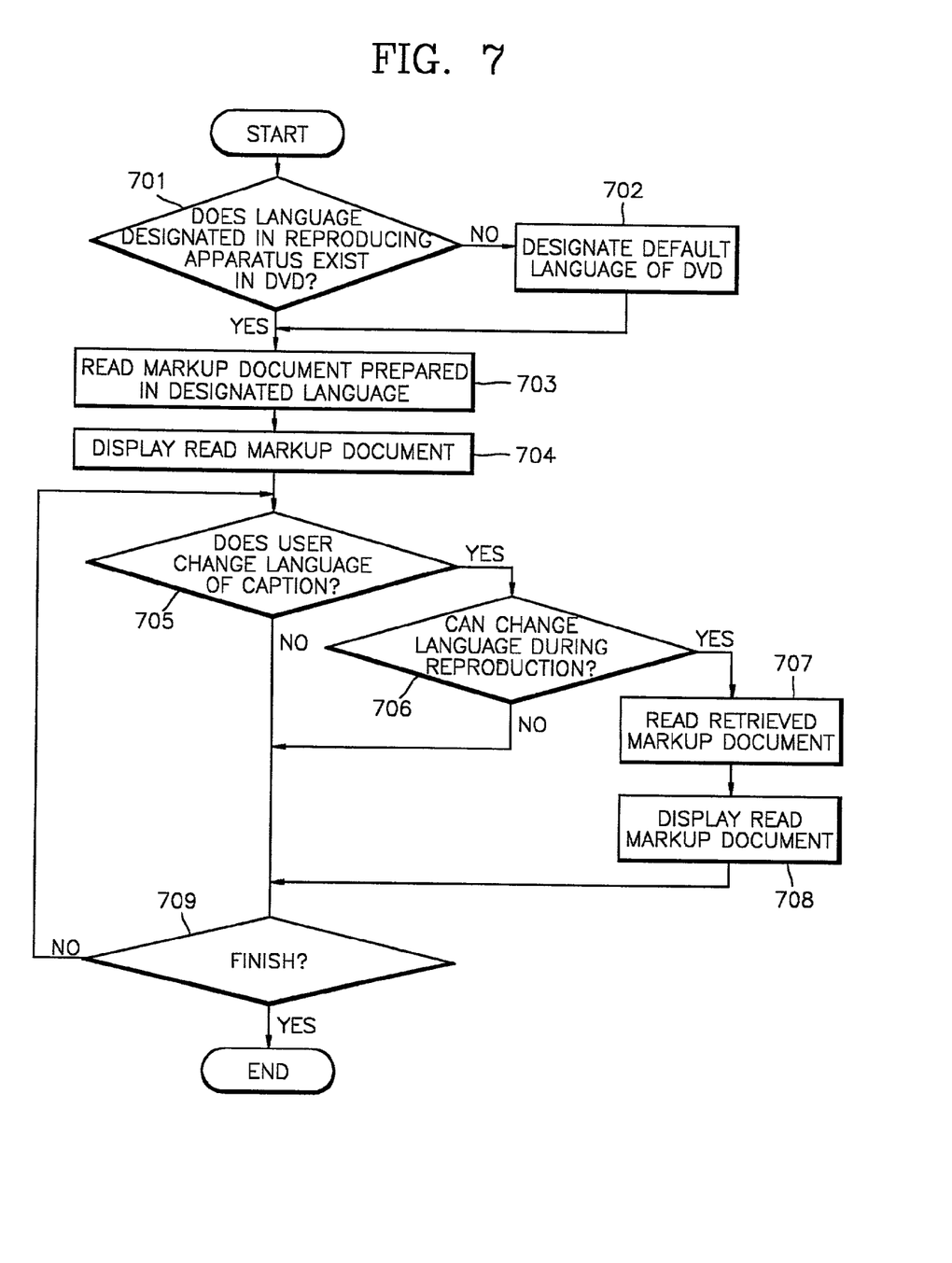
FIG. 7 is a flowchart explaining a reproduction method according to another embodiment of the present invention.

FIG. 7 is a flowchart explaining the reproduction method. With reference to FIG. 7, if the DVD 300 is inserted into the reproducing apparatus, the presentation engine 5 of the reproducing apparatus retrieves the language information contained in the file VIDEO_TS.IFO and determines whether a language designated as the first default value of the reproducing apparatus exists in the language information in operation 701. If the language information contained in the file VIDEO_TS.IFO of the DVD 300 does not have the language designated as the first default value of the reproducing apparatus, the presentation engine 5 sets the language designated as the second default value of the file VIDEO_TS.IFO or DVD_ENAV.IFO of the DVD 300 as the first default value for the reproduction of the markup document in operation 702.

If the language information contained in the file VIDEO_TS.IFO of the DVD 300 has the language designated as the first default value of the reproducing apparatus, the presentation engine 5 sets the language of the second default value as that of the first default value for reproduction of the markup document in operation 701.

The reader 1 reads the markup document prepared in the designated language in operation 703. For example, if the Korean language is set as the default value for reproduction of the markup document, the reader 1 reads A.HTM stored in the Korean directory KOR of the multi-language markup document directory. The presentation engine 5 displays the read markup document in operation 704.

If the user changes the language of the caption in operation 705, the presentation engine 5 determines whether the languages of the displayed markup documents can be changed during the reproduction of the AV data by referring to the multi-language markup document information described above in operation 706. If the language conversion (change) is possible, the presentation engine 5 retrieves the relevant markup document with reference to the multi-language markup document information and the reader 1 reads the retrieved markup document in operation 707. The presentation engine 5 displays the read markup document in operation 708. If the user completes the reproduction of the reproducing apparatus, this process ends in operation 709. If the user changes the language of the caption again during the reproduction, operations 706 through 708 are repeated.

Figure 8:
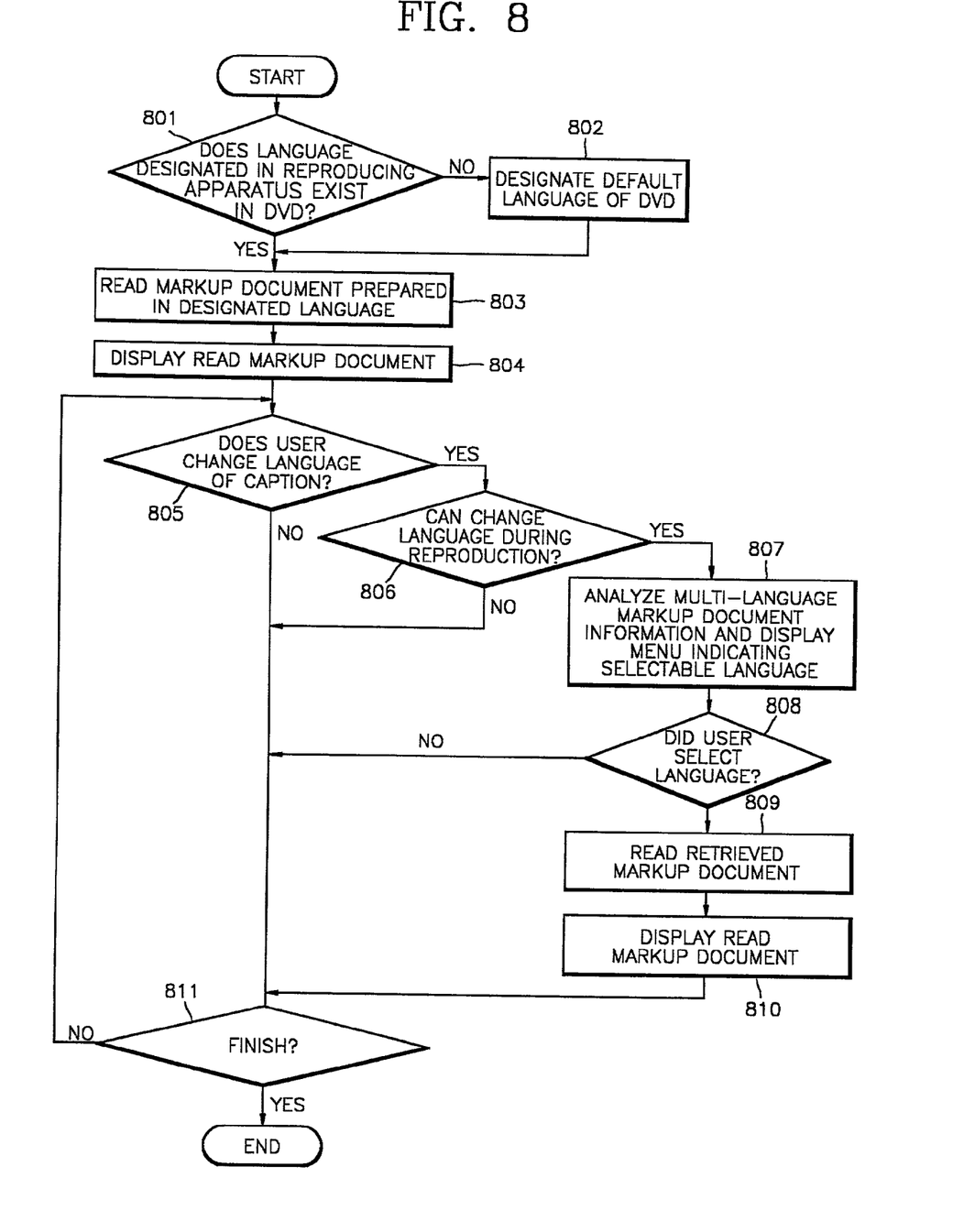
FIG. 8 is a flowchart explaining another reproduction method according to another embodiment of the present invention.

FIG. 8 is a flow chart explaining another reproduction method according to another embodiment of the present invention. With reference to FIG. 8, if the DVD 300 is inserted into the reproducing apparatus, the presentation engine 5 of the reproducing apparatus retrieves the language information contained in the file VIDEO_TS.IFO and the language designated as the first default value of the reproducing apparatus exists in the language information in operation 801. If the language information contained in the file VIDEO_TS.IFO of the DVD 300 does not have the language designated as the first default value of the reproducing apparatus, the presentation engine 5 sets the language designated as the second default value of the file VIDEO_TS.IFO or DVD_ENAV.IFO of the DVD 300 as the default value for the reproduction of the markup document in operation 802.

If the language information contained in the file VIDEO_TS.IFO of the DVD 300 has the language designated as the first default value of the reproducing apparatus, the presentation engine sets the language of the second default value as the first default value for reproduction of the markup document in operation 801.

The reader 1 reads the markup document prepared in the designated language in operation 803. For example, if the Korean language is set as the default value for reproduction of the markup document, the reader 1 reads A.HTM recorded in the Korean directory KOR of the multi-language markup document directory. The presentation engine 5 displays the read markup document in operation 804.

If the user requests the language of the markup document to be changed in operation 805, the presentation engine 5 interprets the multi-language markup document information and determines whether the languages of the displayed markup documents can be changed during reproduction of the AV data in operation 806. If the language change is possible, the presentation engines displays a menu where the kind of displayable languages that can be selected is indicated by referring to the displayable language information of the multi-language markup document information in operation 807. If the user selects the language in operation 808, the presentation engine 5 retrieves the relevant markup document by referring to the language directory information (and the language mapping table) and the reader 1 reads the retrieved markup document in operation 809. The presentation engine 5 displays the read markup document in operation 810. If the user completes the reproduction of the reproducing apparatus, the process ends in operation 811. If the user requests the language of the markup document to be changed again during the reproduction, operations 806 through 810 are repeated.

Thus, the reproducing apparatus and the reproducing method may reproduce the information storage medium to display the first captions corresponding to the video picture of the AV data in the display window and the second captions corresponding to the markup document in the text section of the markup document.

As described above, the present invention relates to the information storage medium having the text information included in the markup document in the interactive mode in multiple languages and to the apparatus for and a method of reproducing the information storage medium.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A computer-readable medium encoded with a computer program, comprising:
    audio/video (AV) data that, when read by a computer, causes the computer to decode and reproduce the audio/video data as an AV stream;
    multiple markup documents containing text information on multiple languages, respectively, which causes the computer to display the text information in a selected language and to define a display window to display AV data decoded and reproduced as the AV data stream; and
    multi-language markup document support information used by the computer to designate one of the markup documents in the selected languages;
    wherein one markup document, among the multiple markup documents, which contains text information in the selected language, is determined according to the multi-language markup document support information.

2. The medium of claim 1, further comprising:
    navigation data included in the AV data, wherein the AV data is decoded and reproduced as the AV data stream with reference to the navigation data.

3. The medium of claim 1, wherein the AV data and the navigation data are recorded in a video directory while the markup documents and the multi-language markup document support information are recorded in an interactive directory other than the video directory.

4. A computer-readable medium encoded with a computer program, comprising:
audio/video (AV) data that, when read by a computer, causes the computer to decode and reproduce the AV data as an AV data stream;
sub-picture data to provide at least one first multi-language caption when decoded and reproduced by the computer together with the AV data;
multiple markup documents, each having at least one second caption containing text information on multiple languages, used by the computer to display the text information in a selected language with regard to the AV data or the sub-picture data, and to define a display window to display the AV data decoded and reproduced by the computer as the AV data stream; and
multi-language markup document support information used by the computer to display one of the markup documents in the selected language;
wherein the sub-picture data having one of the first captions in one language and one of the multiple markup documents having one of the second captions in another language are displayed simultaneously.

5. The medium of claim 4, further comprising:
navigation data related to the AV data and the sub-picture data, wherein the computer decodes and reproduces the AV data and the sub-picture data the AV data stream and the first caption, according to the navigation data.

6. The medium of claim 4, wherein:
the AV data, the sub-picture data, and the navigation data are recorded in a video directory;
and the markup documents and the multi-language markup document support information are recorded in an interactive directory other than the video directory.

7. The medium of claim 6, wherein:
the markup documents are saved in multi-language markup document directories created by language; and
the multi-language markup document directories are sub-directories of the interactive directory.

8. The medium of claim 7, wherein the markup documents containing the same text information displayed in respective multiple languages have the same file name.

9. The medium of claim 6, wherein the multi-language markup document information data comprises:
language selection conversion information data used by the computer to map a related markup document to one of the multiple languages; and
language directory information data used by the computer to indicate a path to the markup documents.

10. The medium of claim 9, wherein the multi-language markup document support information data further comprises supportable language information that can be supported.

11. The medium of claim 10, wherein the supportable language information comprises information that indicates the language that can be supported.

12. The medium of claim 9, wherein the language selection conversion information comprises a language selection conversion table where the second caption is mapped to a relevant language.

13. A reproducing method to reproducing a video picture of AV data or a first caption of sub-picture data representing multi-language captioning recorded on an information storage medium and to display the video picture of the AV data or the first caption of the sub-picture data in a display window defined by a markup document, the reproducing method comprising:
reading one of a plurality of markup documents, each having a second caption and designed to be displayed in a selected language for caption, each of the second captions enabling inserted text information to be displayed in one of a plurality of languages, respectively;
reading and decoding the AV data to generate the video picture; and
displaying the video picture of the AV data and the markup document in accordance with the second caption;
wherein the sub-picture data having one of the first captions in one language and one of the multiple markuo documents having one of the second captions in another language are displayed simultaneously.

14. A reproducing method of reproducing AV data and sub-picture data which are recorded on an information storage medium, and of displaying a video picture of the AV data and a first caption of the sub-picture data in a display window defined by a markup document, the reproducing method comprising:
receiving language information to present a second caption corresponding to a selected language;
identifying a language corresponding to the received language information; and
reading a markup document containing the second caption in a directory corresponding to the identified language;
wherein the sub-picture data having one of the first captiosn in one language and one of the multiple markup documents having one of the second captions in another language are displayed simultaneously.

15. The method of claim 14, wherein the receiving of the language information comprises:
identifying a markup document conversion language code corresponding to the identified language; and
invoking the markup document in a directory where the language code corresponding to the identified language is stored.

16. The method of claim 15, wherein the invoking of the markup document comprises storing the markup document in a directory that has the same name as that of the identified language.

17. A reproducing method of reproducing AV data recorded on an information storage medium and of displaying an AV data stream of the AV data in a display window defined by a markup document, the reproducing method comprising:
reading a markup document to be displayed in a selected language out of a plurality of markup documents that each enable text information of the markup document to be displayed in one of a plurality of languages;
reading and decoding the AV data; and
displaying the AV data as the AV data stream in a display window;
wherein the markup document, among multiple markup documents stored on the information storage medium, which contains text information in the selected language, is determined according to multi-language markup document support information that is used by a reproducing apparatus to designate the markup document.

18. A reproducing method of reproducing AV data recorded on an information storage medium and of displaying the AV data in a display window defined by a markup document, the reproducing method comprising:
receiving language information to display the markup document in a selected language;

retrieving the language corresponding to the received language information; and retrieving and reading the markup document in a directory corresponding to the retrieved language;

wherein the markup document, among multiple markup documents stored on the information storage medium, which contains text information in the selected language, is determined according to multi-language markup document support information that is used by a reproducing apparatus to designate the markup document.

19. The method of claim 18, wherein the retrieving of the language comprises:

verifying if the language can be converted into another language during reproducing the AV data; and retrieving another language if the language conversion is possible.

20. The method of claim 19, wherein the retrieving of the language comprises:

retrieving a markup document conversion language code corresponding to the selected language; and retrieving and invoking the markup document in the directory corresponding to the retrieved language.

21. A reproducing apparatus for reproducing AV data and markup document data recorded on an information storage medium and displaying the AV data in a display window defined by markup document, the reproducing device comprising:

a reader to read necessary data from the information storage medium;

an AV decoder to decode AV data read by the reader; and a presentation engine to display an AV data stream reproduced after the decoder decodes the AV data in a display window defined by a markup document, by interpreting a markup document that enables the inserted text information to be displayed in a selected language, wherein the markup document is one of a plurality of markup documents that enable inserted text information to be displayed in multiple languages, respectively;

wherein the markup document is determined according to multi-language markup document support information that is used by a reproducing apparatus to designate the markup document.

22. A reproducing apparatus for reproducing AV data and sub-picture data that presents multi-language captioning, which are recorded on an information storage medium, and for displaying a video picture of the AV data and a first caption of the sub-picture data in a display window defined by a markup document, the reproducing device comprising:

a reader to read necessary data from the information storage medium;

a decoder to decode AV data read by the reader; and a presentation engine to receive information on a selected language to display a second caption, to interpret a markup document stored in the directory where the received language information is stored by referring to multi-language markup document support information, and to display the AV data stream reproduced after the decoder decodes the AV data in the display window defined by the markup document;

wherein the markup document, among the multiple markup documents, which contains text information in the selected language, is determined according to the multi-language markup document support information that is used by the reproducing apparatus to designate the markup document.

23. The device of claim 22, wherein the presentation engine refers to the multi-language markup document support information to retrieve and provide the markup document stored in a directory corresponding to the selected language.

24. The device of claim 23, wherein the presentation engine refers to the multi-language markup document support information, retrieves a markup document conversion language code corresponding to the language code selected for the second caption, and retrieves and invokes the markup document stored in the directory where the retrieved language code is stored.

25. The device of claim 24, wherein the presentation engine verifies whether a language of the markup document can be converted into another language during reproducing the AV data by referring to the multi-language markup document support information and retrieves and invokes the markup document in another language if the language conversion is possible.

26. The device of claim 24, wherein the presentation engine retrieves and invokes the markup document stored in the directory which has the same name as that of the retrieved language code.

27. A computer-readable medium encoded with a computer program, comprising:

a video directory containing audio/video (AV) data and/or sub-picture data, the AV data representing a video picture while the sub-picture data represents a first caption in a markup document when read and executed; and an interactive directory containing markup document data representing the markup document having a second caption with text information in multiple languages and displaying the text information in the markup document in one of the multiple languages when read and executed;

wherein the sub-picture data having one of the first captions in one language and one of the multiple markup documents having one of the second captions in another language are displayed simultaneously.

28. The medium of claim 27, wherein the video directory comprises:

a control information file containing titles of the AV data, language information of the second caption, and a default value of the titles; and a video object set file containing video data, audio data, and sub-picture data.

29. The medium of claim 27, wherein the interactive directory comprises:

a control file containing control information relating to AV data of the video directory: and a markup document file containing markup documents and text files in multiple languages.

30. The medium of claim 27, wherein the markup document file comprises:

displayable language information representing the kinds of the multiple languages used in the second caption;

language mapping information mapping respective markup documents and respective text information in respective ones of the multiple languages; and language directory information path names coupling the markup documents and the multiple languages.

* * * * *

UNITED STATES PATENT AND TRADEMARK OFFICE
CERTIFICATE OF CORRECTION

PATENT NO.        : 7,376,338 B2                                  Page 1 of 1
APPLICATION NO.   : 10/165427
DATED             : May 20, 2008
INVENTOR(S)       : Byung-jun Kim et al.

It is certified that error appears in the above-identified patent and that said Letters Patent is hereby corrected as shown below:

Column 11, line 26, insert --as-- after "sub-picture data".

Column 12, line 13, change "markuo" to --markup--.

Signed and Sealed this

Fifth Day of August, 2008

JON W. DUDAS
*Director of the United States Patent and Trademark Office*